Patented Nov. 8, 1949

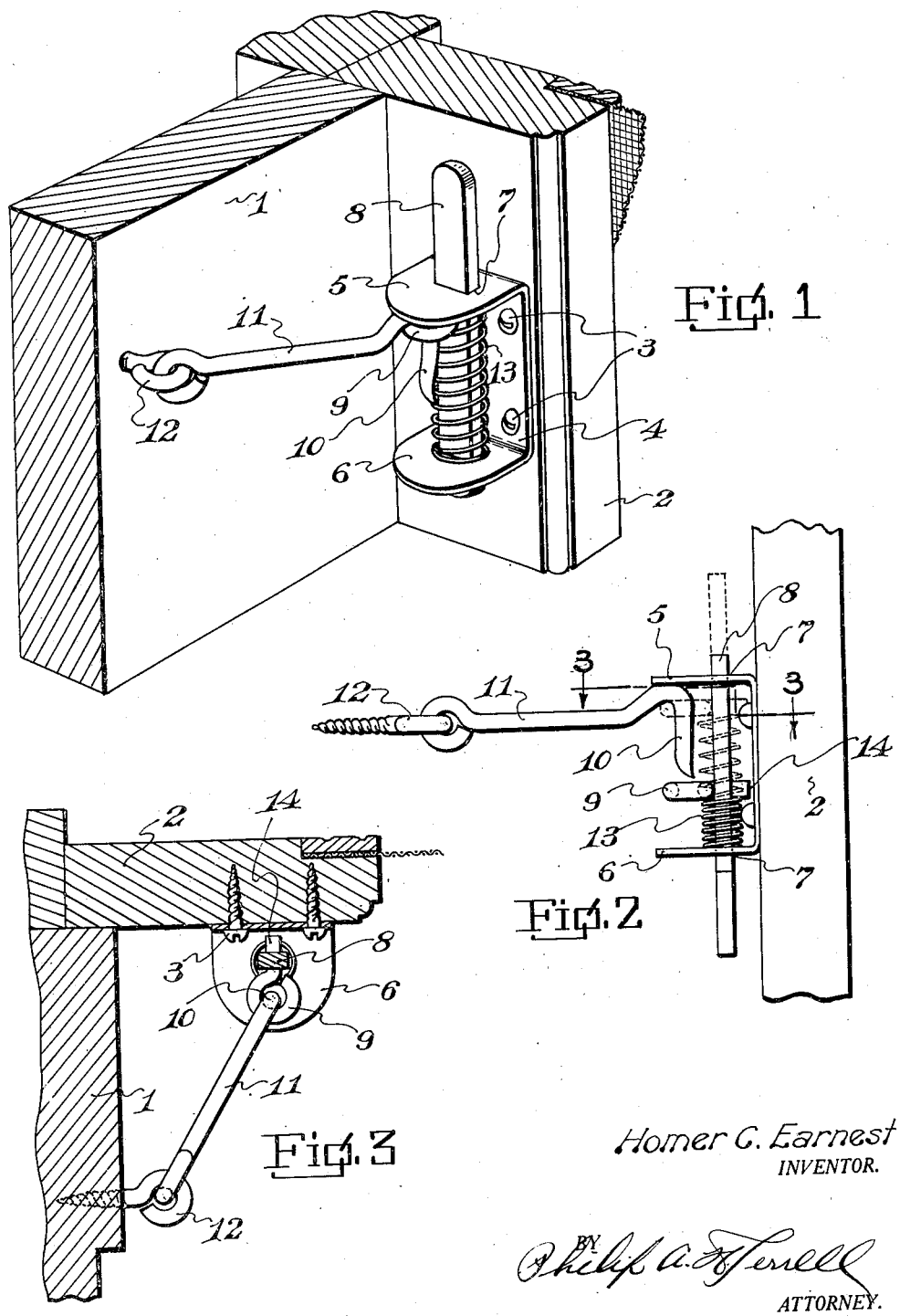

2,487,428

UNITED STATES PATENT OFFICE 2,487,428

HOOK RETAINING DEVICE

Homer C. Earnest, Tulsa, Okla.

Application June 10, 1946, Serial No. 675,801

2 Claims. (Cl. 292—341.17)

The invention relates to hook retaining devices, and has for its object to provide a device of this character, wherein the eye for receiving the hook is spring actuated and moved into interengagement with the hook against a stop for preventing the hook from becoming unhooked, and also preventing the unhooking of the hook by unauthorized persons, by inserting a tool through a screen or the like.

A further object is to provide a hook retaining device which will require two hands to operate, thereby making it more difficult for an unauthorized person to open a closure with a single tool.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the hook and retainer, showing the same applied to a screen door and frame.

Figure 2 is a side elevation of the hook and retainer showing the retainer retracted from the hook.

Figure 3 is a horizontal sectional view taken on line 3—3 of Figure 2.

Referring to the drawing, the numeral 1 designates a portion of a door frame, and 2 the stile of a screen door. Secured to the inner side of the stile, by means of screws 3, is a U-shaped bracket 4, the horizontal ears 5 and 6 of which extend inwardly. Slidably mounted in bearings 7 of the ears 6 and 5, is a vertical latching bar 8. Secured to the latching bar 8, intermediate its ends, and between the ears 5 and 6, is the hook receiving eye 9, adapted to receive the hooked end 10 of a conventional form of hook 11, carried by the screw eye 12, threaded into the frame 1. Surrounding the latching bar 8, between the ears 5 and 6, and interposed between the eye 9 and the ear 6, is an expansion spring 13, which normally urges the eye 9 towards the ear 5 for the hooking operation, clearly shown in dotted lines in Figure 2. It will be noted that when the door is hooked the eye 9 forces the hooked end 10 upwardly against the ear 5, which ear acts as a stop. When it is desired to unhook the door, the operator holds the hook against the ear 5 and pushes downwardly on the upper end of the latching bar 8, hence it will be seen it will take two hands to operate the device, and that the device can not be operatd by an unauthorized person from the outside, with a single tool, for instance a screw driver or stick.

The eye 9 is provided with a shank 14, which shank extends through the bar 8, and partially forms a bearing for the expansion spring 13, and it will be noted that the spring 13 and eye 9 forms a stop for maintaining the ends of the bar 8 in its bearing 7.

From the above it will be seen that a hook retaining device is provided, which is simple in construction, and one wherein if pressure is applied downwardly on the hook, the expansion spring 13 will be compressed, but the hook 10 will retain its interengagement with the bar carried eye 9.

The invention having been set forth what is claimed as new and useful is:

1. A hook end anchoring device, said device comprising a bracket adapted to be attached to a support, said bracket having spaced arms, a shaft slidably mounted in bearings of said arms, said shaft having a hook receiving eye between the spaced arms and adapted to receive a hook and an expansion spring interposed between the eye and one of the arms and forming means for forcing the eye and shaft towards the other arm and maintaining the hook in engagement with the last named arm.

2. A device as set forth in claim 1 including a shank carried by the eye and anchored through the shaft.

HOMER C. EARNEST.

REFERENCES CITED

The following references are of record in the file of this patent:

UNITED STATES PATENTS

| Number | Name | Date |
|---|---|---|
| 613,139 | Grant | Oct. 25, 1898 |
| 708,910 | Noyes | Sept. 9, 1902 |
| 1,402,436 | Myers | Jan. 3, 1922 |
| 1,874,632 | Sanon | Aug. 30, 1932 |